United States Patent Office 2,735,624
Patented Feb. 21, 1956

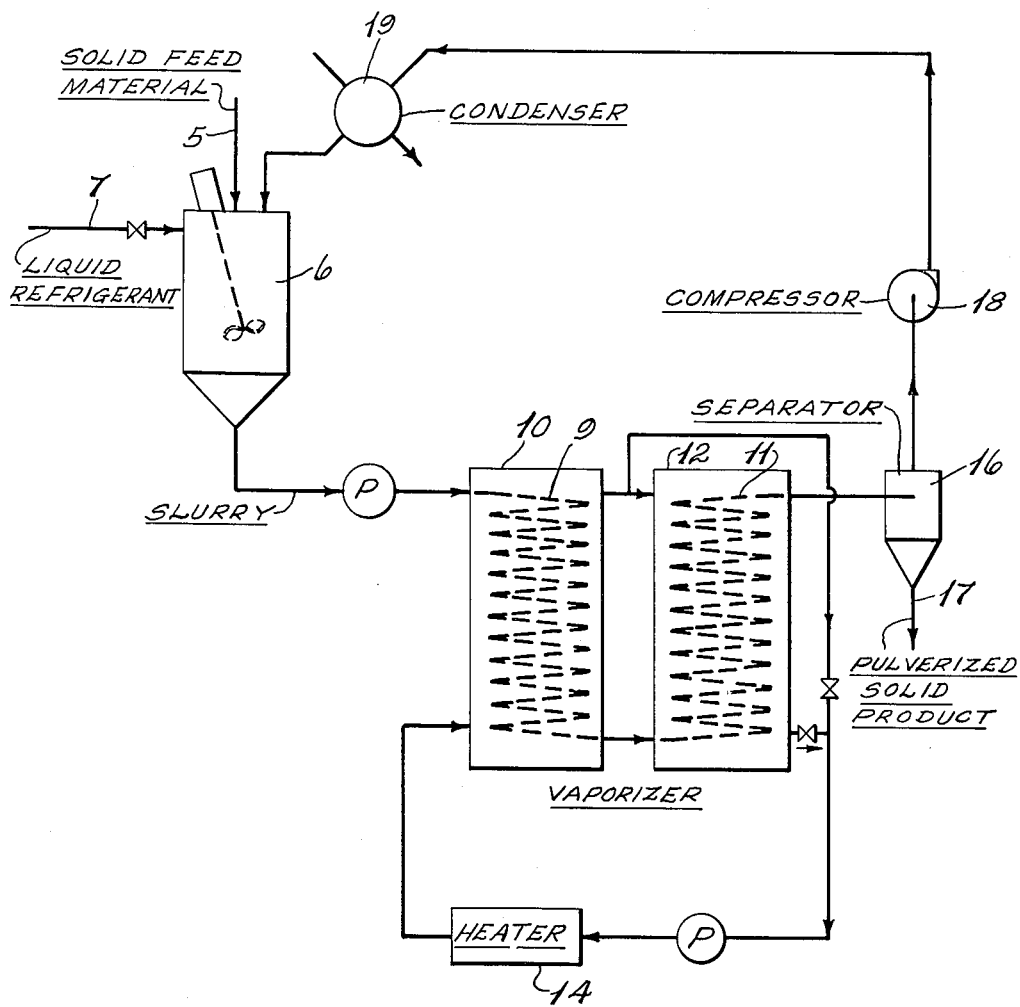

2,735,624

PULVERIZING PROCESS, INCLUDING FORMING A SLURRY OF SOLID PARTICLES AND A LIQUIFIED NORMALLY GASEOUS REFRIGERANT, VAPORIZING THE LIQUID, AND TURBULENTLY PASSING THE VAPORIZED DISPERSION THROUGH A ZONE OF HIGH VELOCITY AND DECREASING PRESSURE

Roland A. Beck, Whittier, Calif., assignor to The Texas Company, New York, N. Y., a corporation of Delaware Application July 10, 1952, Serial No. 298,021

12 Claims. (Cl. 241—17)

The present invention relates to a process for the disintegration of solid materials. In one of its more specific aspects, it relates to pulverization of solid materials at relatively low temperature.

The process of this invention provides a novel method by which solid materials, particularly those which are adversely affected by elevated temperatures, may be economically disintegrated or pulverized. The process is applicable to particle size reduction of various solids, such as, for example, minerals, metals, grains, natural and synthetic resins, rosin, waxes, wood, etc.

An object of this invention is to provide an improved process for reducing the particle size of solid materials. Another object is to provide an improved process for pulverizing heat-sensitive solid materials. Other objects and advantages will be apparent from the following detailed description of the process.

In a co-pending application of Du Bois Eastman and Leon P. Gaucher, Serial No. 49,626, filed September 16, 1948, now abandoned in favor of a continuation application Serial No. 490,214 filed February 24, 1955, a process is disclosed for heating and pulverizing carbonaceous solids. As disclosed in said application, particles of a solid carbonaceous material are mixed with a vaporizable liquid to form a slurry. The slurry is passed as a continuous stream into a heating zone comprising an externally heated conduit wherein the liquid is vaporized and the solid particles suspended in the resulting stream of vapor. Vaporization of the liquid results in a large increase in volume which, in turn, produces a stream of vapor flowing at high velocity. The turbulent flow existing in the high velocity vapor stream results in appreciable disintegration of the solid particles.

The application of this process of pulverization to numerous solid materials was disclosed in the abandoned application of Charles R. Carkeek, Du Bois Eastman and Leon P. Gaucher, Serial No. 110,442, filed August 15, 1949, and is now disclosed in continuation application Serial No. 348,642 filed April 14, 1953.

In accordance with the present invention, fluid pulverization of the type disclosed in said co-pending applications may be applied to heat-sensitive solid materials. Such materials include resins, waxes, certain metals and metal alloys, oil-bearing seeds and nuts, starchy materials, cellulosic materials, and various chemicals.

In carrying out the present invention, a slurry of small particles of the solid material is made up in a liquefied, normally gaseous fluid or refrigerant. The liquefied gas used for preparation of the suspension should be stable and substantially inert with respect to reaction with the solid at the temperatures existing in the system. Various refrigerants, such as ammonia, carbon dioxide, liquefied petroleum gases, e. g., ethane, propane, butane, various halogen derivatives of low boiling hydrocarbons as, for example, methyl chloride, ethyl chloride, dichlorodifluoromethane, trichloromonofluoromethane, monochlorodifluoromethane, dichlorotetrafluoroethane, and the like.

In making up the slurry, a minimum of about 35 per cent liquid by volume is required, based upon the apparent volume of the solid particles. The slurry may be readily pumped with suitable equipment, for example, with a piston pump of the type commonly used for handling drilling mud in oil well drilling operations.

The solid feed material must be of a particle size such that it may be readily handled as a suspension or slurry. Because of apparatus limitations, it is generally preferable that the feed particles be smaller than about ⅛ inch in average diameter. Smaller particles, e. g., particles on the order of about 100 mesh are even more readily handled as a slurry.

The fluid pulverizing process is most suitable for pulverizing or extremely fine grinding. Solids may be mechanically crushed or ground to particle sizes ranging as small as 325 mesh by conventional mechanical means. However, size reduction becomes progressively more expensive as the required particle size decreases. The present process is particularly suitable for production of powders, i. e., products of very fine particle size.

The slurry of solid particles in liquid refrigerant is passed as a continuous stream into a heating zone in a vaporizer wherein the refrigerant is vaporized and a low temperature dispersion of solid particles in vapor forms. The dispersion is made to flow through a succeeding zone in the vaporizer as a confined stream at relatively high velocity along an extended path. Vaporization of the refrigerant may be effectively carried out in a tubular heat exchanger.

It is generally desirable to pass the slurry into and through the vaporizer tube at a velocity within the range of from about ½ to about 10 feet per second, generally within the range of from about 1 to about 5 feet per second. The velocity of the resulting gaseous dispersion of particles is appreciably greater than the velocity of the slurry. The velocity of the gaseous dispersion should be in excess of about 100 feet per second at some point prior to the outlet of the pulverizer. High velocities, up to 3,000 feet per second or more, may be attained, depending upon operating conditions. The velocity required for effective pulverization depends upon the material treated and the particle size specification of the product. For example, waxes are more easily pulverized than metals. Optimum operating conditions for any given job are best determined by trial.

Pressure, in itself, is not generally critical in the pulverization of the solid materials by the fluid energy process. Pressure does, however, have an effect on temperature. The temperature and pressure relationships affecting vaporization are well known. It will be evident that the permissible pressure may be limited by the permissible temperature. Generally, it is desirable to maintain the pressure at a relatively low value, particularly in that portion of the pulverizer in which the refrigerant is in gaseous state, to provide large vapor volume and high velocity.

Orifices, Venturis, and other known types of constrictions, valves, and baffles may be employed, if desired, to effect an increase in velocity or turbulence, or both, in the vapor stream.

Without wishing to limit the present invention in any way, the following explanation is offered as a possible mechanism of the disintegration action obtained in the fluid pulverization process. Highly turbulent flow of the vapors through the piping causes innumerable collisions of the particles with one another and with the walls of the pipe. This results in a high degree of size reduction which may be carried to the point where substantially the entire product has a particle size less than 5 microns in average diameter and a major portion of the particles are smaller than 0.5 micron. By way of comparison, 325 mesh corresponds to 43 microns.

In fluid pulverization, a gasiform dispersion of solid particles is passed at high velocity along an elongated path of flow. The path of flow should be at least 100 times its diameter, and preferably in excess of 1,000 times its diameter. The gasiform dispersion may be heated, if desired, to increase the volume of the vapors and, hence, the velocity of flow and the extent of pulverization. Gaseous refrigerant or extraneous gases may be added to the dispersion, if desired, to increase the velocities in the apparatus.

Part or all of the vapor or gas may be separated from the pulverizer following vaporization. This may be accomplished by means of a cyclone or other conventional separators. The coarser particles of solid may be preferentially separated from the dispersion by means of a conventional classification device and returned to the slurry preparation step for further pulverization. Alternatively, the gasiform refrigerant may be condensed, e. g., by a refrigerant condenser, without previous separation of solid particles therefrom, to form a product comprising a slurry or paste of the solid in the refrigerant.

The invention will be more readily understood from the accompanying drawings and the following detailed description of a preferred mode of operation of the process.

The figure is a diagrammatic elevational view showing a suitable arrangement of apparatus for carrying out a specific embodiment of the process of the present invention.

With reference to the figure, solid material is introduced through line 5 into a mixer 6. Liquefied refrigerant is introduced into the mixer through line 7 in an amount sufficient to form a slurry of the solid in the refrigerant.

The slurry is passed by a pump through a vaporizer coil 9. Heat may be supplied to the vaporizer coil from any suitable source. In this particular instance, water is circulated through a water jacket 10 over the outside of the coil. From coil 9, the refrigerant and entrained solid is passed to an additional coil 11, optionally provided with a water jacket 12. Any desired number of coils may be provided.

All of the vaporization may take place in coil 9. The resulting vapors entrain the solid particles to form a gasiform dispersion of solid particles in refrigerant vapor. Following vaporization, additional heat may be supplied to superheat the vapors, if so desired, by means of coil 11. Alternatively, coil 11 may be unheated, the vapors expanding and cooling in this portion of the apparatus.

Heat may be supplied to either or both coils 9 and 11 by circulating water through jackets 10 and 12. The water is circulated by a pump through a heater 14 from which it may be supplied to jacket 10 and, if desired, also to jacket 12.

The gasiform dispersion of solid particles in vapor is discharged from coil 11 into a separator 16 of the cyclone type. Pulverized solid is discharged from the separator through line 17. Vapors separated from the solid are compressed by compressor 18 and passed to condenser 19. Condensate from the condenser returns to mixer 6 as slurrying medium for additional solid feed material.

Provision may be made for charging the solid material into mixer 6 under elevated pressure. Means for accomplishing this are well known in the art and form no part of the present invention. Similarly, provision may be made for discharging the product from separator 17 while the latter is operated either under superatmospheric pressure or under a partial vacuum.

As a specific example of one application of my invention, a slurry of 95 pounds of magnesium particles, 99 per cent of which are smaller than 100 mesh, is made up in 150 pounds of liquefied propane. The slurry is fed at a rate of about 1,000 pounds per hour into a tubular pulverizer comprising three double coils, each containing 230 feet of ½ inch extra heavy seamless pipe. Each coil is formed by winding the pipe on 14 inch and 18 inch mandrels with a pitch of 2 inches. Heat is supplied to the coils by circulation of water at 250° F. over the three coils in series in the same direction of flow as the slurry.

The slurry enters the first coil at a pressure of 250 pounds per square inch gauge and the pressure is reduced as the dispersion flows so that it is discharged from the third coil into a cyclone separator at approximately 50 pounds per square inch gauge. The temperature of the vapor at the outlet of the third coil is about 160° F.

Following separation of the solid particles from the vapors in the cyclone separator, the vapors are recompressed to about 255 pounds per square inch gauge and passed to a water-cooled condenser where they are condensed. The condensate is recycled. The particle size of the magnesium is considerably reduced in passing through the pulverizer coils.

Obviously, many modifications and variations of the above invention as hereinbefore set forth may be made without departing from the spirit and scope thereof, and therefore, only such limitations should be imposed as are indicated in the appended claims.

I claim:

1. A process which comprises forming a mixture of particles of a solid material with a liquefied normally gaseous refrigerant, passing said mixture into and through a heating zone wherein said refrigerant is substantially completely vaporized thereby forming a low temperature dispersion of solid particles in a stream of the resulting vapor, passing said dispersion through a succeeding zone of high velocity flow while reducing the pressure thereof, subjecting the flowing stream therein to turbulence and high velocity whereby said particles are subjected to the disintegrating action resulting from said highly turbulent flow, and discharging from said high velocity zone said stream containing finely ground solids suspended therein.

2. A process as defined in claim 1 wherein said refrigerant is liquefied normally gaseous hydrocarbon.

3. A process in accordance with claim 1 wherein said refrigerant is selected from the group consisting of ammonia, carbon dioxide, ethane, propane, butane, methyl chloride, ethyl chloride, dichlorodifluoromethane, trichlorofluoromethane, monochlorodifluoromethane, and dichlorotetrafluoroethane.

4. A process as defined in claim 1 wherein said stream of dispersion is passed at a velocity in excess of about 100 feet per second.

5. A process in accordance with claim 1, also comprising separating such vapor from the disintegrated solid particles, reliquefying the separated vapor, and delivering the reliquefied vapor to said mixture.

6. A process for pulverizing a solid material which comprises forming a slurry of said solid in particle form with a liquefied normally gaseous refrigerant, passing said slurry as a confined stream in turbulent flow along an elongated path in a heating zone wherein said refrigerant is substantially completely vaporized thereby forming a low temperature dispersion of solid particles in a stream of the resulting vapor, and passing said dispersion as a confined stream in highly turbulent flow along an elongated path while reducing the pressure thereof whereby said particles are subjected to the disintegrating action resulting from said highly turbulent flow.

7. A process as defined in claim 6 wherein said particles have a size range within the range of from about ⅛ inch to about 325 mesh.

8. A process for pulverizing a solid material which comprises forming a slurry of particles of said solid material having a size range within the range of from about ⅛ inch to about 325 mesh with a liquefied normally gaseous refrigerant, passing said slurry as a confined stream in turbulent flow along an elongated path in a heating zone at a velocity within the range of from about ½ to about 10 feet per second, vaporizing substantially all of said refrigerant from said slurry within said heating zone to form a low temperature dispersion of said solid particles in a stream of the resulting vapor, and passing the resulting dispersion as a confined stream in highly turbulent flow along an extended path while reducing the pressure thereof whereby said particles are subjected to the disintegrating action resulting from said highly turbulent flow.

9. A process as defined in claim 8 wherein said extended path has a length in excess of 100 times its diameter.

10. A process as defined in claim 9 wherein said flow paths of said slurry and said dispersion are circular in cross-section and are substantially uniform in cross-sectional area.

11. Apparatus for pulverizing particles of a solid material comprising first means for forming a flowable mixture of said particles in a liquefied normally gaseous refrigerant; a vaporizer connected to said first means for receiving mixture therefrom, said vaporizer being exposed to a heating medium for converting said refrigerant to a vapor to form a dispersion of said particles in such vapor traveling at high velocity and in highly turbulent flow whereby said particles are pulverized; second means for separating said vapor from the pulverized particles; third means for reliquefying such vapor; and means connecting said third means to said first means, for returning liquid refrigerant to said mixture.

12. Apparatus for pulverizing particles of a solid material comprising first means for forming a slurry of said particles in a liquefied normally gaseous refrigerant; an elongated pulverizing tube connected to said first means for receiving slurry therefrom, said tube being exposed to a heating medium for converting said refrigerant to a vapor to form a dispersion of said particles in such vapor traveling through said tube at high velocity and in highly turbulent flow whereby said particles are pulverized; second means for separating such vapor from the pulverized particles; a compressor connected to said second means, for compressing such vapor; a condenser connected to said compressor, for reliquefying such vapor; and means connecting said condenser to said first means, for returning liquid refrigerant to said slurry.

References Cited in the file of this patent

UNITED STATES PATENTS

| | | |
|---|---|---|
| 2,021,143 | Calcott | Nov. 19, 1935 |
| 2,062,374 | Noel | Dec. 1, 1936 |
| 2,242,796 | Stockton | May 20, 1941 |
| 2,315,083 | Chesler | Mar. 30, 1943 |
| 2,315,084 | Chesler | Mar. 30, 1943 |
| 2,560,807 | Lobo | July 17, 1951 |